D. H. YEISER.
Portable Stock Sheds.
No. 142,069. Patented August 19, 1873.
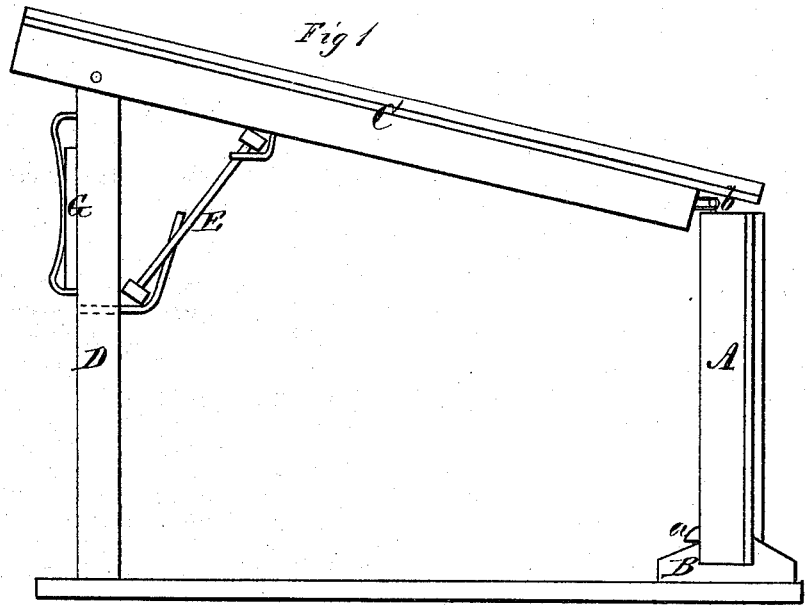
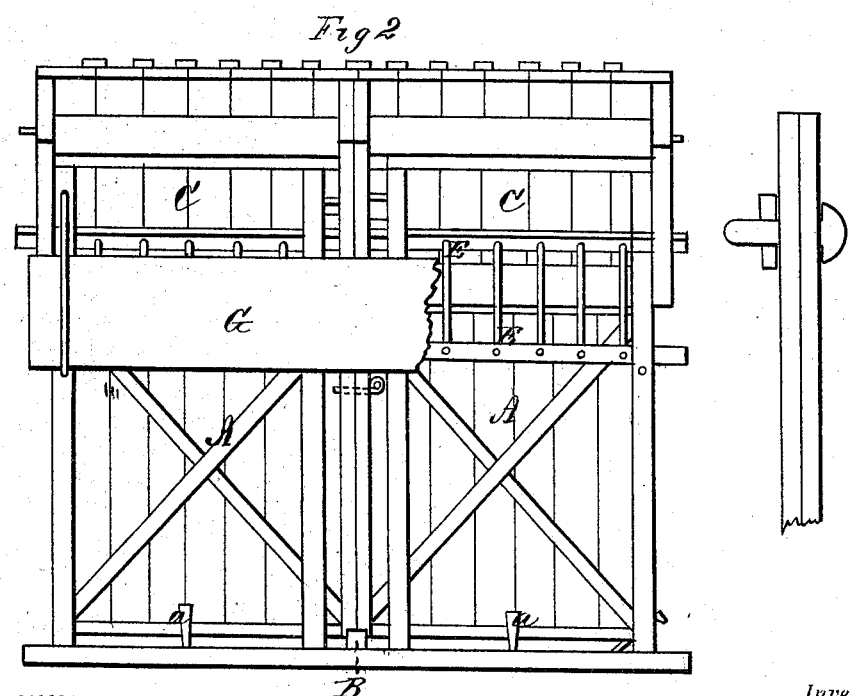
Witnesses: Inventor.
Franck L. Durand Daniel H. Yeiser
C. L. Everts per
Alexander Mason
Attorneys.

UNITED STATES PATENT OFFICE.

DANIEL H. YEISER, OF DANVILLE, KENTUCKY.

IMPROVEMENT IN PORTABLE STOCK-SHEDS.

Specification forming part of Letters Patent No. 142,069, dated August 19, 1873; application filed March 21, 1873.

*To all whom it may concern:*

Be it known that I, DANIEL H. YEISER, of Danville, in the county of Boyle and in the State of Kentucky, have invented certain new and useful Improvements in Portable Stock-Sheds; and do hereby declare that the following is a full, clear, and exact description thereof, reference being had to the accompanying drawings and to the letters of reference marked thereon making a part of this specification.

The nature of my invention consists in the construction and arrangement of a portable sectional stock-shed, for feeding cattle or other stock, as will be hereinafter more fully set forth.

In order to enable others skilled in the art to which my invention appertains to make and use the same, I will now proceed to describe its construction and operation, referring to the annexed drawing, in which—

Figure 1 is a side elevation, and Fig. 2 a front view, of my invention.

A A represent the back-sections, each of which is composed of a rectangular frame with diagonal braces, boarded and battened in any suitable manner. These sections may be of any desired width and height, and are set on grooved blocks B to keep them off the ground. They are secured to the ground with stubs *a a*, made with shoulders so as to catch over the bottom piece of timber of the section; or they may be secured with stubs passing through staples or rings in the bottom piece of timber, or by any other means that will secure them firmly to the ground. C C represent the top sections, which may be made of any size desired, and are each composed of a frame covered with plank, shingles, or boards, and said sections are secured to the back sections A A by suitable hooks and staples *b*, easy of adjustment. The front part of the top sections C C are supported by posts D D secured to the sections by bolts or other suitable means, and anchored to the ground, into the ground, or otherwise, as desired. A rack, E, is also arranged for each section, secured by hooks, staples, and iron or wood pins in the posts, so arranged as to be easily adjusted. An apron, G, is so arranged in front of the rack E as to be easily adjusted and prevent provender from falling out in front of the rack A feed-trough may be attached to the back section to feed grain or other food to the stock.

The shed thus constructed may be made straight or circular, as desired, and consist of as many sections as required. It is cheap in construction, can be made by any rough mechanic or farmers themselves, and is durable. The sections can be fastened together, so as to be easily taken apart and moved from field to field. It can be easily moved to the poor places of ground, thereby manuring and improving the land. When not in use it can be taken down and packed in a barn or other shelter until wanted for future use.

Having thus fully described my invention, what I claim as new, and desire to secure by Letters Patent, is—

A portable stock-shed, composed of the back sections A, top sections C, posts D, adjustable rack E, and adjustable apron G, all constructed, arranged, and combined together, substantially in the manner and for the purposes herein set forth.

In testimony that I claim the foregoing I have hereunto set my hand this 3d day of March, 1873.

D. H. YEISER.

Witnesses:
I. M. WALLACE.
JOHN SHELLEY.